United States Patent [19]

Umemoto et al.

[11] Patent Number: 5,247,401
[45] Date of Patent: Sep. 21, 1993

[54] REPLAY EQUALIZATION CIRCUIT IN DIGITAL IMAGE RECORDER

[75] Inventors: Masuo Umemoto, Nishitama; Hidehiko Sawamura, Hachioji; Yoshizumi Eto, Sagamihara, all of Japan

[73] Assignee: Hitachi, Ltd., Tokyo, Japan

[21] Appl. No.: 364,457

[22] Filed: Jun. 12, 1989

[30] Foreign Application Priority Data

Jun. 27, 1988 [JP] Japan .................. 63-156642

[51] Int. Cl.⁵ ............................................ G11B 5/035
[52] U.S. Cl. .................................. 360/65; 360/32; 360/51; 360/10.3; 358/338
[58] Field of Search .................. 360/10.3, 10.1, 27, 360/32, 45, 36.2, 46, 65, 51; 358/312, 315, 316, 318, 337, 338, 335

[56] References Cited

U.S. PATENT DOCUMENTS

| | | | |
|---|---|---|---|
| 4,093,965 | 6/1978 | Gish | 360/65 |
| 4,274,116 | 6/1981 | Ida | 360/65 |
| 4,371,901 | 2/1983 | Shah | 360/65 |
| 4,577,241 | 3/1986 | Wilkinson | 360/51 |
| 4,580,176 | 4/1986 | Graves et al. | 360/65 |
| 4,736,257 | 4/1988 | Watanabe et al. | 360/65 X |
| 4,930,024 | 5/1990 | Kanda et al. | 358/335 X |
| 5,008,761 | 4/1991 | Nishiyama et al. | 360/45 |
| 5,021,894 | 6/1991 | Naito et al. | 360/46 |

Primary Examiner—Andrew L. Sniezek
Attorney, Agent, or Firm—Antonelli, Terry, Stout & Kraus

[57] ABSTRACT

A replay equalization circuit for reproducing digital image information recorded on a recording medium includes a transducer for reading the digital image information, an equalization circuit connected to the transducer for equalizing an output of the transducer based on a speed information input, a clock recovery circuit connected to the equalization circuit for extracting a clock signal from an output of the equalization circuit for latching the output of the equalization circuit in response to the clock signal.

3 Claims, 3 Drawing Sheets

REPLAY EQUALIZATION CIRCUIT IN DIGITAL IMAGE RECORDER

BACKGROUND OF THE INVENTION

This invention relates to a digital image information data reproducing apparatus and more particularly to a replay equalization circuit suitable for variable speed replay.

The relative speed of the VTR tape/head is expressed as a function of the head rotating speed, the winding angle of the tape on the drum and the tape running speed. The tape/head relative speed increases as the tape running speed is increased as during the fast forward.

U.S. Pat. No. 4,577,241 describes a clock recovery circuit using a PLL (phase locked loop) circuit, which extracts clocks from the recorded data on the tape that match the replay speed when the digital VTR is replayed at a tape/head relative speed different from that for recording as during the fast forward. (This replay is simply referred to as a variable speed replay.) However, since the frequency characteristic required to obtain the replay signals from the tape changes according to the replay speed, some measures to adjust the equalization circuit for changes in the replay speed in order to reproduce a quality picture must be provided, not only in the clock recovery circuit but also in the equalization circuit—which compensates for the tape/head frequency characteristic during the recording and reproducing process. So far, however, no reference has been made to this point. Nor have any corrective steps been taken.

In the conventional apparatus, the equalizing frequency characteristic of the replay equalization circuit is constant during the variable speed replay. Therefore, the replay equalization circuit fails to match the increased tape/head relative speed and thus produces inter-symbol interference. This in turn deteriorates an eye opening factor—which represents the state of equalization—increasing the code error.

The same problem that occurs when the tape is fast-fed during replay at a speed higher than that during recording with the digital VTR's also exists with other types of digital image information reproducing apparatuses, which consist of a recording medium corresponding to the tape, a recording/reproducing transducer corresponding to the head, and a replay equalization circuit.

SUMMARY OF THE INVENTION

An object of this invention is to provide a digital image information reproducing apparatus which has little inter-symbol interference during the variable speed replay and thereby produces a good image quality.

Another object of this invention is to provide a replay equalization circuit suitable for a digital image information data reproducing apparatus.

The replay equalization circuit of this invention takes in a replay signal and a speed information signal, and produces an equalization output signal according to the speed information signal taken in. The speed information signal may be a tape speed, for instance. The speed information signal is used to control the clock interval of the digital filter that forms the replay equalization circuit or to control the delay time of the analog filter.

Let $V_r$ stand for a relative speed of the recording medium with respect to the recording/replay transducer during the recording and $V_p$ for the relative speed during the replay. The signal frequency $f_r$ recorded with the recording wavelength $\lambda_r$ is $f_r = V_r/\lambda_r$. During the variable speed replay the reproduced signal frequency $f_p$ will be $f_p = V_p/\lambda_r$, that is, $f_r \neq f_p$. Thus, the bit frequency will change from $f_{Br}$, a bit frequency during recording, to $f_{Bp}$, the frequency during replay, as expressed below.

$$f_{Bp} = f_{Br} V_p / V_r$$

On the other hand, to reproduce waveforms that have little inter-symbol interference, it is known that the frequency characteristic of amplitude or phase as the output characteristic of the equalization circuit to have the so-called Nyquist characteristic. Namely, when the relative speed during the replay is equal to that during the recording, the frequency characteristic, particularly in the high frequency zone, must be such that the upper and lower frequencies are symmetrical with respect to a point half the frequency of $f_{Br}$.

In order to obtain a good quality picture during the variable speed replay, it is therefore necessary to set the replay equalization frequency characteristic in such a manner that it will have the Nyquist characteristic for the frequency $f_{Bp}$.

In this invention, a speed information signal and a variable speed replay equalization means makes it possible to make the element variable that sets the frequency characteristic according to the changes in the relative speed. Thereby it is possible to produce an output with the Nyquist characteristic that corresponds to the frequency $f_{Bp}$.

Controlling the clock period of the digital filter to equalize the reproduced signals during the variable speed replay allows the Nyquist characteristic to be achieved according to $f_{Bp}$ by shortening the clock intervals when the relative speed is increased during replay. This changes the elements in the digital circuit, making it easier to manufacture the circuit in the form of an LSI and improving the precision of the equalized output.

In this invention, controlling the delay time of the analog filter with a delay element to equalize the reproduced signals during the variable speed replay makes it possible to obtain the Nyquist characteristic corresponding to $f_{Bp}$ by changing the amount of delay in accordance with the change in the relative speed. This changes the analog circuit element, and thereby contributes to simplifying the circuit and reducing the cost.

DESCRIPTION OF THE PREFERRED EMBODIMENTS

Figure 1:
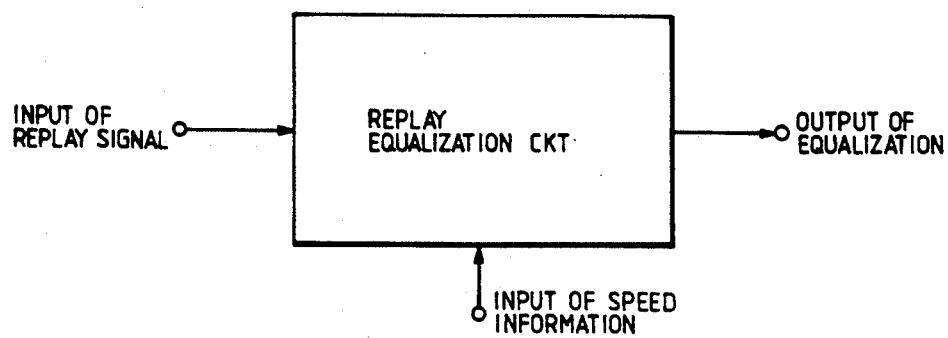
FIG. 1 is a fundamental configuration of one embodiment of this invention.

FIG. 1 shows a basic configuration of an embodiment according to this invention. What is different from the basic configuration of the conventional replay equalization circuit is that a speed information input signal is inputted. Further, the characteristic setting element is controlled to produce the required Nyquist characteristic in accordance with the relative speed between the recording medium and the recording/replay transducer during the variable speed replay.

Figure 2:
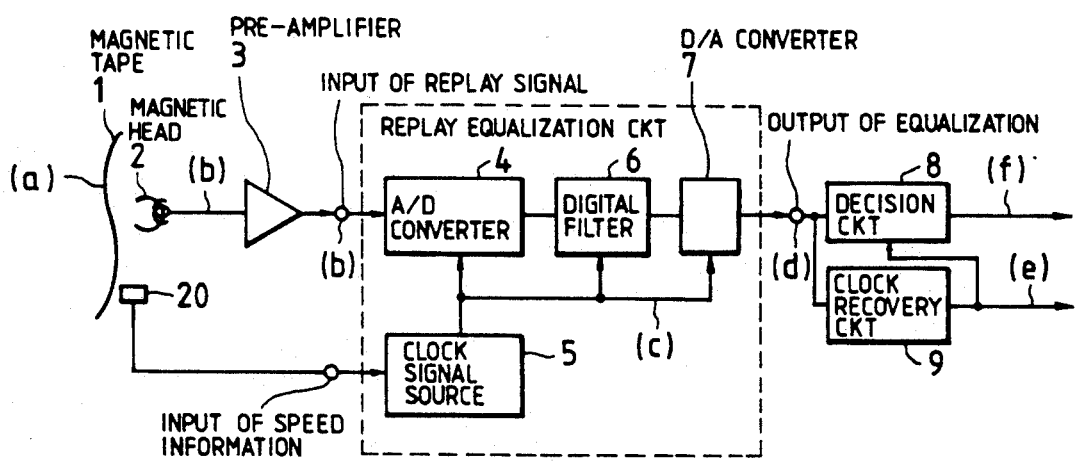
FIG. 2 is circuitry showing a replay equalization circuit of the digital VTR as one embodiment of this invention.
Figure 3A:
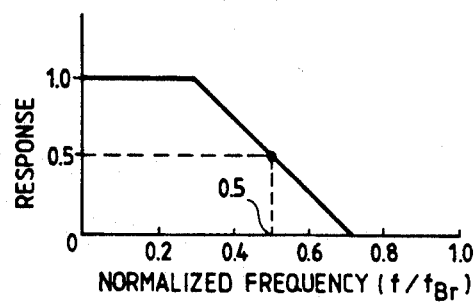
FIGS. 3A and 3B are diagrams showing the frequency characteristics required of the reproduced signal during the normal speed replay and during the variable speed replay.
Figure 3B:
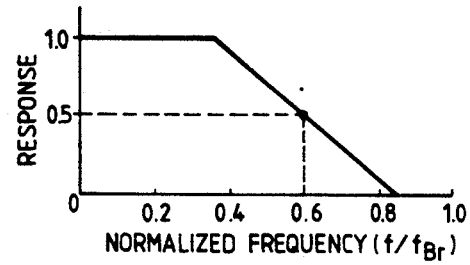

FIG. 2 is an embodiment of the replay equalization circuit for a digital VTR according to this invention. FIGS. 3A and 3B show frequency characteristics necessary for the replay signals during the normal speed and the variable speed. FIGS. 4A to 4F show waveforms of each circuit element in FIG. 2.

In FIG. 2, reference numeral 1 represents a magnetic tape, 2 a magnetic head, 3 a pre-amplifier, 4 an A/D converter, 5 a clock supply circuit, 6 a digital filter, 7 a D/A converter, 8 a decision circuit, 9 a clock recovery circuit, and 20 a tape speed detector. (a) to (f) correspond to the waveforms shown in FIGS. 4A to 4F.

Figure 4A:
FIGS. 4A to 4F are waveform diagrams showing waveforms in each element of the circuit of FIG. 2.
Figure 4B:
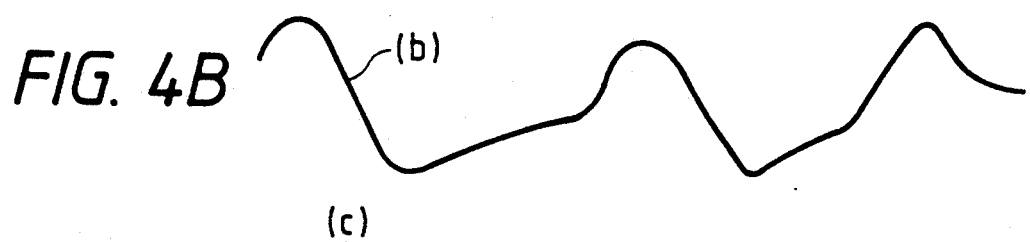
Figure 4C:
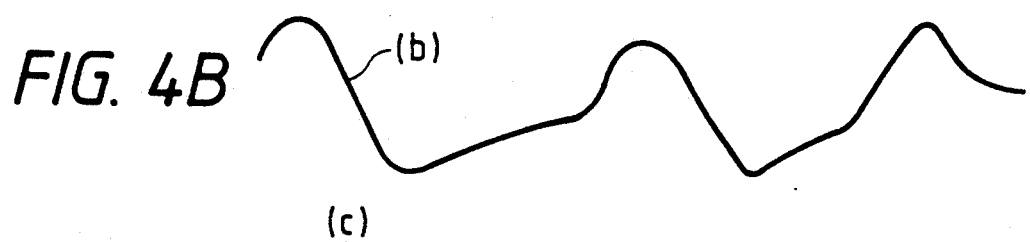
Figure 4D:
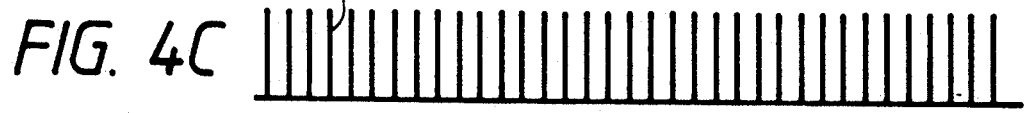
Figure 4E:
Figure 4F:
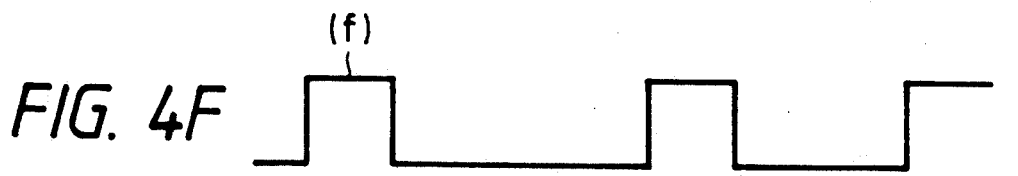

FIG. 4A shows a recorded data waveform; FIG. 4B shows a replay signal waveform from the magnetic head 2; FIG. 4C shows a sampling clock output by the clock signal source circuit 5; FIG. 4D shows an analog signal waveform of the D/A converter output; FIG. 4E shows a clock component waveform that corresponds to the bit frequency $f_{Br}$ during recording; and FIG. 4F shows an output data waveform.

The operation of the circuit shown in FIG. 2 will be explained in connection with FIG. 4. The replay signal (b) is extracted from the magnetic tape by the magnetic head 2 and amplified by the pre-amplifier 3 before being digitized by the A/D converter 4. If we assume the bit frequency of the digital signal during recording is $f_{BR}$, the sampling frequency of the A/D converter 4 needs to be about two or more times $f_{Br}$. The sampling clock (c) is output by the clock signal source circuit 5. The converted digital signal is then supplied to a digital filter 6 to compensate for the tape-head frequency characteristic so that the replay signal will have the Nyquist frequency characteristic. That is, as shown in FIG. 3A, the frequency f is normalized for the bit frequency $f_{Br}$ during recording. If the response on the lower frequency side is 1, the frequency is compensated for in such a manner that the higher and lower frequencies will be symmetrical with each other with respect to a point corresponding to the normalized frequency of 0.5 and the response of 0.5. In this way, the frequency compensation is achieved for the normal speed. The output of the digital filter 6 is transformed into an analog signal (d) by a D/A converter 7. The output waveform after frequency-compensation is almost a digital waveform, from which is extracted, by a clock recovery circuit 9, a clock component (e) which corresponds to the bit frequency $f_{Br}$ during recording. According to the clock (e), the decision circuit 8 latches the D/A output (d) to obtain data (f), which corresponds to the recorded data (a).

The magnetic tape transport system for recording and reproducing digital signals is a helical scan system which transports the magnetic tape while winding it on the circumferential surface of the rotating drum. When the digital information to be recorded is image data, it would be convenient for the user if the system had a search function which would cause the tape to travel at a speed higher than normal when searching for a desired picture.

When the tape is run at high speeds, the relative speed of the head and tape changes. When the relative speed increases, say, by 1.2 times, the frequency of the signal reproduced also increases by 1.2 times. Hence, as shown in FIG. 3B, the Nyquist characteristic of the replay equalizatiion circuit must be shifted toward higher frequencies than in FIG. 3A.

The tape speed is determined by measuring the intervals of the synchronization signals recorded on the tape. The clock signal source circuit 5 receives this tape speed information and, according to the tape speed, increases the frequency of the clock. This in turn shifts the frequency characteristic of the digital filter 6 toward higher frequencies, thus providing the equalized frequency characteristic according to the tape/head relative speed as shown in FIG. 3B.

Figure 5:
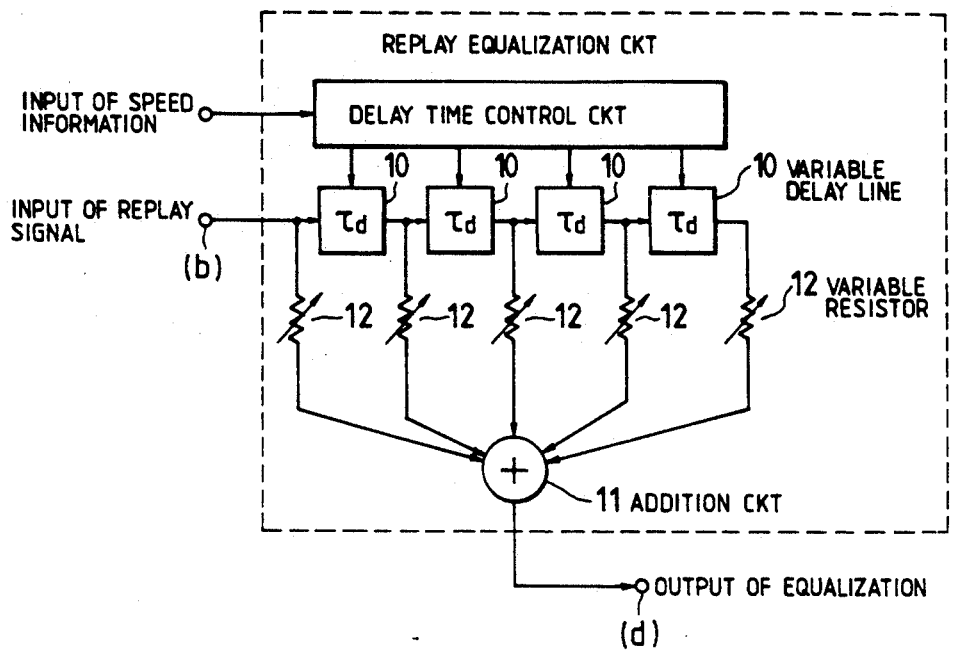
FIG. 5 is circuitry showing a replay equalization circuit as another embodiment of this invention.

FIG. 5 shows another example of the replay equalization circuit according to this invention. The reproduced signal (b) is input to one variable delay line 10 after another. The outputs of each variable delay line 10 are added by an addition circuit 11—through variable resistors 12 which apply specified factors to these outputs—in order to produce a frequency-compensated output (d).

According to the tape speed as determined by the speed information received, the amount of delay is changed for all the variable delay lines simultaneously. For example, when the tape/head relative speed increases, the delay time is controlled to become shorter than the delay time during the normal speed, thus achieving a desired frequency compensation of the reproduced signal.

Figure 6:
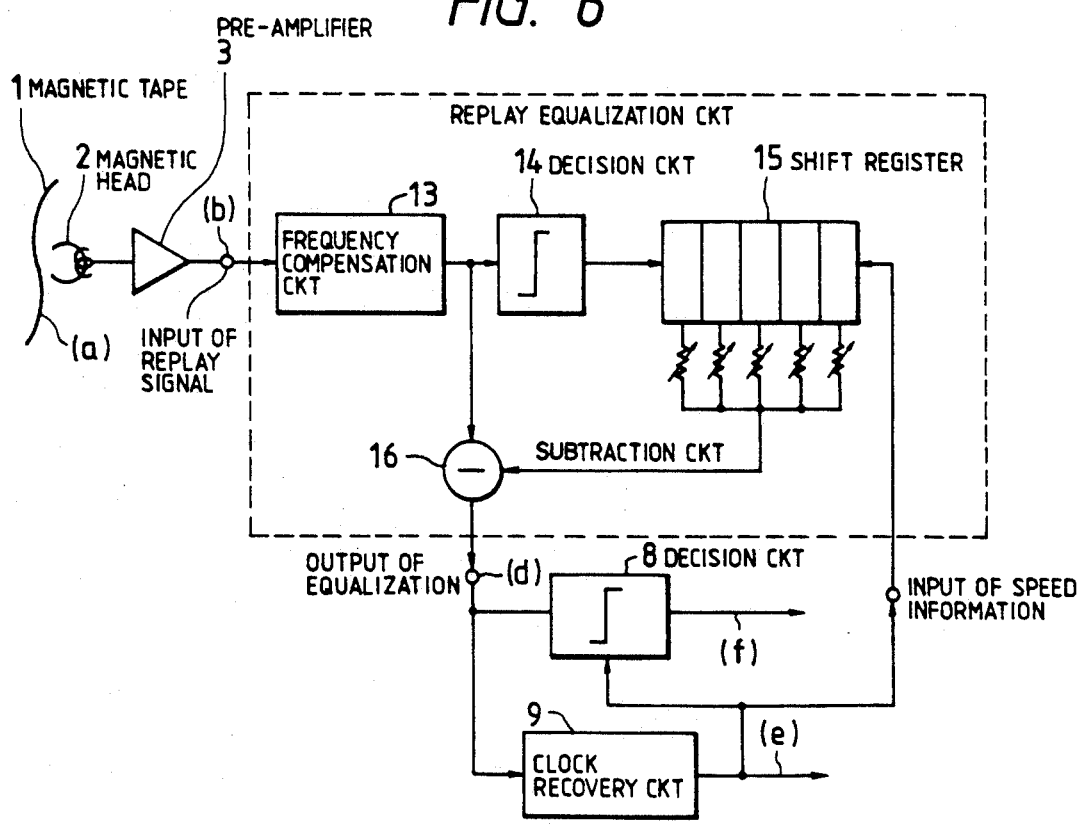
FIG. 6 is a circuitry showing a replay equalization circuit as still another embodiment of this invention.

FIG. 6 is a still another example of this invention which consists of an analog fixed equalization circuit and a compensation circuit using binary digital signals to reduce the size of the digital filter circuit of FIG. 2.

In FIG. 6 the circuits with identical reference numbers to those of FIG. 2 have the identical functions. The reproduced signal (b) from the pre-amplifier 3 is fed to a frequency compensation circuit 13, which is a preliminary equalization circuit and whose frequency characteristic is fixed with respect to the tape/head relative speed. The reproduced signal is then digitized by a preliminary decision circuit 14. The digital data is entered into a multiple-stage shift register 15, whose outputs are applied with specified factors before being added and then subtracted from the output of the frequency compensation circuit 13 by a subtraction circuit 16. This eliminates the interference component, which was left uncompensated by the preliminary equalization circuit 13, thus producing the replay signal (d) that has a correct frequency characteristic.

When the tape/head relative speed changes, the output of the clock recovery circuit 9, which represents the updated speed information, is fed to the shift register 15 as the transfer clock. As a result, a proper frequency compensation is performed according to the change in the relative speed, thus producing the correct data (f).

In the digital filter shown in FIG. 2, when the frequency of the sampling clock (c) is set higher than $f_{Br}$, the sampling clock frequency is kept at a constant value and the coefficient of the arithmetic circuit forming the digital filter is varied according to the tape/head relative speed to achieve a desired frequency compensation.

This also constitutes one of the embodiments of the invention

While the descriptions on the above embodiments center on the frequency characteristic compensation alone, it is also possible to provide a compensation in the phase characteristic, which is of course necessary for reducing the error rate.

With this invention, the Nyquist characteristic can be obtained at all times even when the replay is being conducted at variable speeds. This means that the inter-symbol interference is reduced, which in turn contributes to significant improvement in the error rate and the image quality during the variable speed replay.

Also, the digital filter which applies this invention has the advantage of being able to easily form an LSI equalization circuit with high precision. Moreover, the invention, when applied to the analog filter, has the advantage of being able to easily form a small and inexpensive equalization circuit.

We claim:

1. An apparatus for reproducing, at variable replay speeds, digital image information data recorded on a recording medium, comprising:
   a transducer for reading digital image information data recorded on a recording medium and for producing an output representing a digital image;
   means for generating a speed information signal representing a variable replay speed of the recording medium;
   an equalization circuit connected to the transducer for equalizing an output signal of the transducer in response to the speed information signal to produce an equalized output according to the speed information signal;
   a clock recovery circuit connected to the equalization circuit for extracting a clock signal from the output of the equalization circuit; and
   a decision circuit connected to the equalization circuit for latching the output of the equalization circuit in response to the clock signal extracted by the clock recovery circuit to produce output data corresponding to the digital image information data recorded on the recording medium;
   wherein the equalization circuit comprises:
   a clock signal source circuit for producing a clock signal at different pulse rates according to the received speed information signal;
   an A/D converter for converting an analog signal from the transducer into a digital signal in response to the clock signal output from the clock supply circuit;
   a digital filter for compensating the output of the A/D converter in response to the clock signal from the clock signal source circuit; and
   a D/A converter for converting digital output signals of the digital filter into an analog signal in response to the clock signal from the clock signal source circuit.

2. An equalization circuit used in an apparatus which reproduces, through a transducer at variable reply speeds, digital image information data recorded on a recording medium, comprising:
   a clock signal source circuit for producing a clock signal at different pulse rates indicative of a running speed of the recording medium;
   an A/D converter for converting an analog signal received from the transducer into a digital signal in response to the clock signal from the clock signal source circuit;
   a digital filter for compensating the output of the A/D converter in response to the clock signal from the clock signal source circuit; and
   a D/A converter for converting the digital signal from the digital filter into an analog signal in response to the clock signal from the clock signal source circuit.

3. An apparatus for reproducing, at a variable replay speed, digital image information recorded as a sequence of code symbols on a magnetic tape, comprising:
   means for transporting the magnetic tape at a selectively variable tape speed;
   a rotating drum contacting the magnetic tape;
   a magnetic head mounted on the rotating drum and contacting the magnetic tape for reproducing the digital image information recorded on the magnetic tape as a replay signal having a waveform determined by the sequence of code symbols of the digital image information and a tape/head frequency characteristic of the magnetic tape and the magnetic head, the tape/head frequency characteristic varying as the tape speed of the magnetic tape varies;
   means for detecting the tape speed of the magnetic tape and generating a speed information signal indicative of the detected tape speed;
   equalization means, receiving the replay signal and the speed information signal and having an equalization characteristic which changes in response to changes in the speed information signal, for equalizing the replay signal in accordance with the equalization characteristic to compensate for the tape/head frequency characteristic, thereby producing an equalized signal substantially free of inter-symbol interference, the equalization means including:
   means, receiving the speed information signal, for generating a sampling clock signal having a frequency corresponding to the tape speed of the magnetic tape based on the speed information signal,
   an A/D converter, receiving the replay signal as an input signal and the sampling clock signal as a clock signal, for converting the replay signal into a digital signal,
   a digital filter, receiving the digital signal as an input signal and the sampling clock signal as a clock signal and having a frequency characteristic which changes in response to changes in the frequency of the sampling clock signal, for filtering the digital signal to compensate for the tape/head frequency characteristic, thereby producing an equalized digital signal substantially free of inter-symbol interference, and
   a D/A converter, receiving the equalized digital signal as an input signal and the sampling clock signal as a clock signal, for converting the equalized digital signal into an analog signal, the analog signal being the equalized signal;
   means, receiving the equalized signal, for extracting a clock signal from the equalized signal; and
   means, receiving the equalized signal and the clock signal, for periodically detecting a level of the equalized signal and converting the detected level into a corresponding one of the code symbols at timings determined by the clock signal, thereby producing an output signal corresponding to the digital image information recorded on the magnetic tape.

* * * * *